Dec. 27, 1966  E. LORENZ ET AL  3,294,943
RESISTANCE MEASURING CIRCUIT
Filed Feb. 11, 1963
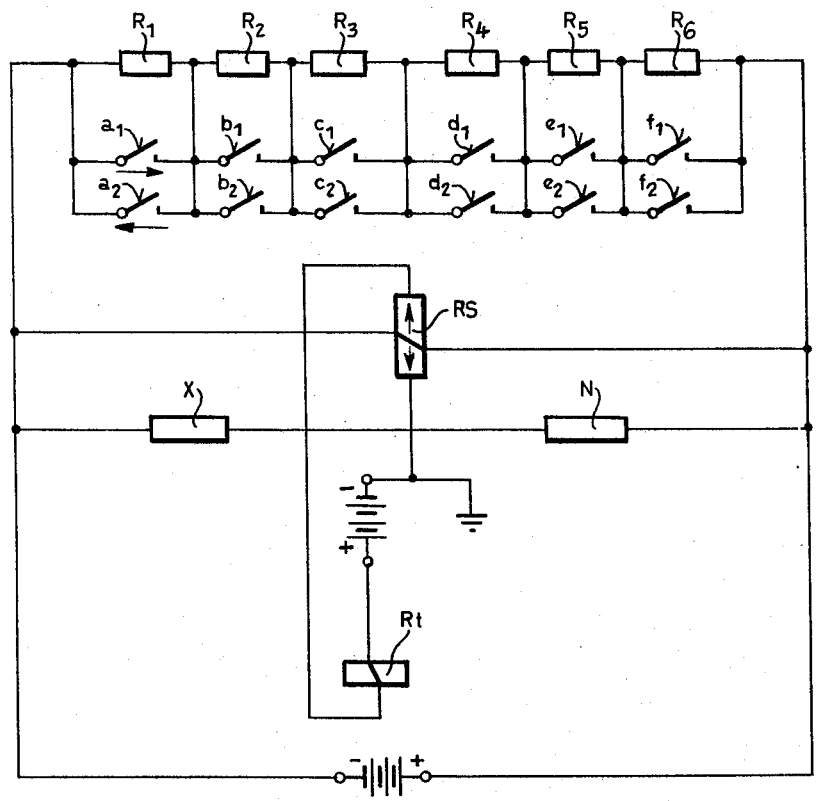

United States Patent Office 3,294,943
Patented Dec. 27, 1966

3,294,943
RESISTANCE MEASURING CIRCUIT
Eberhard Lorenz, Karlsruhe, and Franz R. Thös, Durmersheim, Germany, assignors to Siemens & Halske Aktiengesellschaft Berlin and Munich, a corporation of Germany
Filed Feb. 11, 1963, Ser. No. 257,709
Claims priority, application Germany, Feb. 15, 1962, S 78,042
5 Claims. (Cl. 200—166)

The invention disclosed herein is concerned with an electrical resistance measuring circuit comprising one or more relay contacts for bridging measuring resistance means or parts thereof.

Automatically operating switching or circuit arrangements often require the use of rapidly operating relays, for example, relays of the sealed-in reed type. The high operating speed of such relays is mainly due to extremely short paths of motion of the contact members and the very small masses thereof. Some types of circuits require the provision of a great many serially disposed relay contacts which are respectively connected in the circuit by corresponding soldering points. Upon appearance of temperature differences, there occur thermal voltages between successively disposed soldering points; in the case of measuring circuits, such voltages may falsify the measurement results.

The invention overcomes the above indicated drawbacks, in connection with an electrical measuring circuit comprising one or more pairs of relay contacts, by bridging each respective contact pair by a second contact pair wherein possibly occurring thermal voltages are oriented oppositely to those occurring in the first contact pair. The provision of such auxiliary bridging contacts results in an overall improvement of the circuit, such improvement residing in reduction of the effective contact resistances by doubling the respective contacts by the connection of the bridging contacts in parallel therewith, and by compensating the thermal voltages to such extent that at the most a difference between the thermal voltages can exteriorly appear as an effect thereof.

An embodiment of the invention is shown in the accompanying drawing.

The drawing shows a bridge circuit for use, for example, in measuring a resistance X. The bridge circuit comprises a plurality of measuring resistances $R_1$–$R_6$ which are in stages differently dimensioned and form one bridge arm. The second bridge arm is formed by the resistance X which is to be measured and a comparison resistance N. In order to ascertain the magnitude of the resistance X, there are provided relays (not shown) which control the respective pairs of contacts $a_1$–$f_1$ for short-circuiting the respective individual resistances $R_1$–$R_6$, so as to balance the resistance X with the resistance N. Only six resistances $R_1$–$R_6$ are shown, but it is understood that the number thereof may be different as may be necessary for obtaining the desired balancing operation.

Since the connections associated with each contact pair $a_1$–$f_1$ produces a thermal voltage, the serial connection of many contacts such as $a_1$–$f_1$, may produce a noticeable interference voltage due to the summation of the individual thermal voltages.

In order to overcome the effect of these thermal voltages, there are provided second or auxiliary contacts $a_2$–$f_2$ which, in the embodiment illustrated, are respectively disposed in parallel with corresponding contacts $a_1$–$f_1$; care being taken, however, that the respective connections are arranged to produce in connection with the solder points of these second contacts $a_2$–$f_2$ thermal voltages which are oppositely oriented with respect to the thermal voltages occurring along the solder points of the first contacts $a_1$–$f_1$. This is indicated by the arrows shown below the respective contacts $a_1$ and $a_2$.

Upon short-circuiting the proper resistances $R_1$–$R_6$, by the simultaneous actuation of the respective first and second pairs of the contacts associated with the respective resistances, only those of these resistances will remain operatively connected which produce in the bridge circuit an equilibrium or balance between the resistances X and N. This balance produces actuation of a polarized relay RS in one direction thereof. So long as the sum of the short circuited resistances $R_1$–$R_6$ does not correspond to the value of resistance X, the relay RS will be actuated in the other direction, thereby causing actuation of a relay R$t$ which operates to prepare for the short circuiting of further resistances in the series of resistances $R_1$–$R_6$.

While it is advantageous to connect corresponding pairs of contacts in parallel whereby the contact resistance in the circuit is thus reduced by the simultaneous actuation of such contacts, the advantages of balanced thermal voltages can also be achieved by a series connection of the corresponding pairs of contacts, maintaining, however, a reversal of the connection points of the one pair with respect to the connection points of the second pair to insure opposite orientation in the circuit of the respective thermal voltages.

Changes may be made within the scope and spirit of the appended claims which define what is believed to be new and desired to have protected by Letters Patent.

We claim:

1. In a measuring circuit with at least one pair of relay-actuated contacts disposed therein by means of soldered points of connection between different metals at two respective points of different temperature, whereby thermal voltages are produced, the combination of an additional pair of relay-actuated contacts disposed with its respective soldered points of connection at points of the same temperature as the corresponding soldered points of the first pair of contacts, said second contact pair being disposed in the circuit including said first pair of contacts and actuatable therewith, with the soldered points of connection of the second pair being reversed therein with respect to the corresponding soldered points of connection of the first contact pair, whereby the respective thermal voltages produced at the respective contact pairs will be oppositely oriented.

2. A circuit according to claim 1, wherein said second pair of contacts is circuited in parallel with the first pair of contacts, whereby the effective contact resistance in the circuit is reduced.

3. A circuit according to claim 1, wherein the second pair of contacts is serially connected with the first pair of contacts.

4. A circuit according to claim 2, wherein the respective pairs of contacts are of the sealed-in type.

5. A circuit according to claim 3, wherein the respective pairs of contacts are of the sealed-in reed type.

References Cited by the Examiner
UNITED STATES PATENTS 2,659,861  11/1953  Branson _____ 324—64
2,767,264  10/1956  Scott.

ROBERT K. SCHAEFER, *Primary Examiner.*

MILTON O. HIRSHFIELD, *Examiner.*

A. D. PELLINEN, H. O. JONES, *Assistant Examiners.*